US010063276B2

(12) United States Patent
Tomeba et al.

(10) Patent No.: US 10,063,276 B2
(45) Date of Patent: Aug. 28, 2018

(54) BASE-STATION DEVICE, TERMINAL DEVICE, TRANSMISSION METHOD, AND RECEPTION METHOD

(71) Applicant: Sharp Kabushiki Kaisha, Osaka-shi, Osaka (JP)

(72) Inventors: Hiromichi Tomeba, Osaka (JP); Ryota Yamada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 28 days.

(21) Appl. No.: 15/039,059

(22) PCT Filed: Nov. 28, 2014

(86) PCT No.: PCT/JP2014/081531
§ 371 (c)(1),
(2) Date: May 25, 2016

(87) PCT Pub. No.: WO2015/087716
PCT Pub. Date: Jun. 18, 2015

(65) Prior Publication Data
US 2016/0365891 A1  Dec. 15, 2016

(30) Foreign Application Priority Data
Dec. 13, 2013  (JP) .................................. 2013-257539

(51) Int. Cl.
*H04L 27/06*  (2006.01)
*H04B 7/216*  (2006.01)
(Continued)

(52) U.S. Cl.
CPC ........... *H04B 1/707* (2013.01); *H04B 7/0452* (2013.01); *H04B 7/0456* (2013.01);
(Continued)

(58) Field of Classification Search
CPC ........ H04J 13/16; H04J 13/10; H04J 13/0077; H04J 11/0046; H04J 2013/0037; H04J 3/22; H04J 4/00
(Continued)

(56) References Cited

U.S. PATENT DOCUMENTS 5,355,417 A * 10/1994 Burdisso .............. G10K 11/178
381/71.7
6,207,936 B1 * 3/2001 de Waard ............. G05B 13/027
219/412
(Continued)

OTHER PUBLICATIONS

Official Communication issued in International Patent Application No. PCT/JP2014/081531, dated Feb. 24, 2015.
(Continued)

*Primary Examiner* — Sam K Ahn
*Assistant Examiner* — Sarah Hassan
(74) *Attorney, Agent, or Firm* — Keating & Bennett, LLP (57) ABSTRACT

Provided is a base-station device, a terminal device, a transmission method, and a reception method that realize efficient transmission in a radio communication system that performs large-scale MU-MIMO transmission. The base-station device having a plurality of antennas and performing communication with a plurality of terminal devices simultaneously, includes a channel state information acquisition unit for acquiring channel state information with respect to the plurality of terminal devices; a signal spreading unit for performing spreading and multiplexing for a plurality of signals addressed to each of the terminal devices by using a spread code in a spatial direction of each of the terminal devices; and a precoding unit for applying precoding to the signals, which have been spread and multiplexed, based on the channel state information.

8 Claims, 5 Drawing Sheets

(51) Int. Cl.
*H04B 1/707* (2011.01)
*H04J 13/10* (2011.01)
*H04J 13/00* (2011.01)
*H04B 7/0452* (2017.01)
*H04B 7/06* (2006.01)
*H04B 7/0456* (2017.01)

(52) U.S. Cl.
CPC ............ *H04B 7/0626* (2013.01); *H04J 13/00* (2013.01); *H04J 13/0003* (2013.01); *H04J 13/10* (2013.01)

(58) Field of Classification Search
USPC .......................................... 375/341; 370/320
See application file for complete search history.

(56) References Cited

U.S. PATENT DOCUMENTS

| | | | | |
|---|---|---|---|---|
| 7,151,803 | B1* | 12/2006 | Sonalkar | H04L 5/14 375/260 |
| 7,586,981 | B2* | 9/2009 | Chae | H04B 7/0854 375/148 |
| 7,864,903 | B2* | 1/2011 | Murakami | H04B 7/0413 375/219 |
| 2001/0048725 | A1* | 12/2001 | Hicks | H04B 7/082 375/341 |
| 2003/0215006 | A1* | 11/2003 | Raghothaman | H04B 7/0636 375/220 |
| 2004/0120274 | A1* | 6/2004 | Petre | H04B 7/04 370/320 |
| 2008/0080635 | A1* | 4/2008 | Hugl | H04L 1/0028 375/267 |
| 2008/0311939 | A1* | 12/2008 | Hugl | H04B 7/0417 455/507 |
| 2010/0104036 | A1* | 4/2010 | Liao | H04L 1/0072 375/260 |
| 2012/0033571 | A1* | 2/2012 | Shimezawa | H04B 7/026 370/252 |
| 2012/0307781 | A1* | 12/2012 | Enomoto | H04L 1/1861 370/329 |
| 2013/0044797 | A1* | 2/2013 | Nammi | H04B 7/0413 375/224 |

OTHER PUBLICATIONS

Rusek et al., "Scaling Up MIMO: Opportunities and challenges with very large arrays", IEEE Signal Processing Magazine, Jan. 2013, pp. 40-60.

Medles et al., "Achieving the Optimal Diversity-vs-Multiplexing Tradeoff for MIMO Flat Channels with QAM Space-Time Spreading and DFE Equalization", IEEE Transactions on Information Theory, Dec. 2016, pp. 1-22.

* cited by examiner

BASE-STATION DEVICE, TERMINAL DEVICE, TRANSMISSION METHOD, AND RECEPTION METHOD

TECHNICAL FIELD

The present invention relates to a technique of performing Multiple-Input Multiple-Output transmission.

BACKGROUND ART

Though expansion of a transmission bandwidth is effective for realizing high-speed and high-volume radio communication, usable frequency band is limited. Thus, it has been studied to secure a bandwidth for the radio transmission by using ultra-high frequency band which has not been assumed to be used in mobile radio communication so far. However, propagation loss (path loss) in which a strength of radio wave is attenuated exponentially with respect to a communication distance becomes great as a communication frequency (carrier frequency) becomes high. This suggests that great transmit power is required for the radio transmission using ultra-high frequency band.

On the other hand, in a recent radio communication system, Multiple-Input Multiple-Output (MIMO) transmission using a plurality of transmit and receive antennas has been put into practical use for improvement in spectral efficiency. When carrier frequency is high, it is possible to make intervals between a plurality of antennas included in a base-station device and a terminal device shorter, so that it is possible to install a large number of antennas without changing an installation area.

Attention being paid to this fact, in recent years, Massive Multiple Input Multiple Output (Massive MIMO) transmission which realizes high-volume communication by using as many as several hundred antennas has been attracting attention (described in NPL 1). The Massive MIMO allows improvement in a Signal-to-Noise power Ratio (SNR) by beam forming using a large number of antennas arranged in a base-station device, thus making it possible to compensate reduction in received-SNR caused by an increase in propagation loss in ultra-high frequency transmission without extremely increasing transmit power.

Meanwhile, when the carrier frequency is high, radio wave generally has outstanding straightness and correlation between radio channels becomes relatively high. This suggests that it is difficult to improve a communication speed by increasing the number of transmission streams in MIMO. Under such an environment, Multi-User MIMO (MU-MIMO) in which MIMO transmission is performed with a plurality of terminal devices regarded as a virtual large array antenna is effective. In the MU-MIMO transmission, it is necessary to suppress Inter-User-Interference (IUI) in which signals addressed to each of the terminal devices are observed as interference.

CITATION LIST

Patent Literature

NPL 1: F. Rusek, et. al., "Scaling up MIMO: Opportunities and challenges with very large arrays," IEEE Signal Process. Mag., Vol. 30, No. 1, pp. 40-60, January 2013.

SUMMARY OF INVENTION

Technical Problem

In a radio communication system using ultra-high frequency band, while it is essential to secure received-SNR by Massive MIMO, it is also necessary to apply a MU-MIMO technique for realizing improvement in a communication speed.

In Massive MIMO transmission assuming beam forming, however, when a terminal device includes a plurality of antennas, it is difficult to simply perform the beam forming. In MU-MIMO transmission, though precoding is required to suppress IUI, a precoder needs to be optimized according to a combination of terminal devices. However, in Massive MIMO transmission using as many as several hundred transmit antennas, a matrix size of the precoder is also the order of several hundreds, so that it is not easy to change the precoder and a load to a base-station device becomes great.

The invention has been made in view of such circumstances and an object thereof is to provide a base-station device, a terminal device, a transmission method, and a reception method which realize high-efficient transmission in a radio communication system performing large-scale MU-MIMO transmission.

Solution to Problem (1) The invention has taken the following means in order to achieve the aforementioned object. That is, a base-station device of the invention is a base-station device having a plurality of antennas and performing communication with a plurality of terminal devices simultaneously, including: a channel state information acquisition unit for acquiring channel state information with respect to the plurality of terminal devices; a signal spreading unit for performing spreading and multiplexing for a plurality of signals addressed to each of the terminal devices by using a spread code in a spatial direction of each of the terminal devices; and a precoding unit for applying precoding to the signals, which have been spread and multiplexed, based on the channel state information.

By spreading and multiplexing the plurality of signals addressed to the plurality of terminal devices in the spatial direction of each of the terminal devices, such a base-station device is able to adaptively change a transmission rate of each of the terminal devices easily.

(2) Moreover, the precoding unit of the base-station device of the invention applies precoding to the signals, which have been spread and multiplexed, based on the channel state information and the spread code.

Since such a base-station device is able to perform the precoding based on the channel state information with respect to the plurality of terminal devices and the spread code used for spreading and multiplexing the plurality of signals addressed to each of the terminal devices in the spatial direction of each of the terminal devices, it is possible to improve reception quality of each of the terminal devices.

(3) Moreover, the signal spreading unit of the base-station device of the invention determines the spread code to be used for spreading and multiplexing based on the precoding.

Since such a base-station device is able to determine the spread code to be used for spreading and multiplexing the plurality of signals addressed to each of the terminal devices in the spatial direction of each of the terminal devices based on the precoding, it is possible to improve reception quality of each of the terminal devices.

(4) Moreover, in the base-station device of the invention, at least a part of the spread code is different among the plurality of terminal devices.

Since such a base-station device is able to suppress at least a part of interference by spread gain, it is possible to improve reception quality of each of the terminal devices.

(5) Moreover, the signal spreading unit of the base-station device of the invention further spreads the signals, which have been spread and multiplexed in the spatial direction of each of the terminal devices, in any direction of a time direction, a frequency direction, and a time/frequency direction.

Since such a base-station device is able to suppress at least a part of interference by spread gain, it is possible to improve reception quality of each of the terminal devices.

(6) Moreover, in the base-station device of the invention, information indicating the spread code used by the signal spreading unit is notified to the plurality of terminal devices.

When such a base-station device notifies the plurality of terminal devices of the information indicating the spread code used by the signal spreading unit, the plurality of terminal devices are able to grasp the spread code used by the signal spreading unit, so that the plurality of terminal devices are able to perform appropriate despreading processing, thus making it possible to improve reception quality.

(7) Moreover, in the base-station device of the invention, information indicating a spread code to be used for despreading the signals which have been spread and multiplexed in the spatial direction, and information indicating a channel equalization method for demodulating the signals subjected to the precoding are notified to the plurality of terminal devices.

Since such a base-station device is able to notify the plurality of terminal devices of a method of despreading and the information of indicating the channel equalization method, the plurality of terminal devices are able to perform despreading and channel equalization highly efficiently and improve reception quality.

(8) Moreover, a terminal device of the invention is a terminal device having a plurality of antennas and performing communication with a base-station device, including: a channel estimation unit for estimating channel state information with respect to the base-station device; a signal despreading unit for performing despreading for signals received by the plurality of antennas in a spatial direction; and a channel equalization unit for demodulating a desired signal in the signals subjected to despreading processing based on the channel state information.

Since such a terminal device is able to apply despreading processing in the spatial direction, interference is able to be suppressed by spread gain, thus making it possible to improve reception quality.

(9) Moreover, the signal despreading unit of the terminal device of the invention further despreads the signals, which have been despread in the spatial direction, in any direction of a time direction, a frequency direction, and a time/frequency direction.

Since such a terminal device is able to apply despreading processing in a direction other than the spatial direction, interference is able to be suppressed by spread gain, thus making it possible to improve reception quality.

(10) Moreover, in the terminal device of the invention, a spread code to be used for despreading by the signal despreading unit is determined based on information indicating a spread code notified by the base-station device.

Since such a terminal device is able to easily specify the spread code to be used for despreading processing, it is possible to perform appropriate despreading processing and improve reception quality.

(11) Moreover, a transmission method of the invention includes a step of acquiring channel state information with respect to a plurality of terminal devices; a step of performing spreading and multiplexing for a plurality of signals addressed to each of the terminal devices by using a spread code in a spatial direction of each of the terminal devices; and a step of applying precoding to the signals, which have been spread and multiplexed, based on the channel state information.

With such a transmission method, by spreading and multiplexing the plurality of signals addressed to the plurality of terminal devices in the spatial direction of each of the terminal devices, it is possible to cause a base-station device to exert a function of capable of adaptively changing a transmission rate of each of the terminal devices easily, thus making it possible to contribute to improvement in spectral efficiency.

(12) Moreover, a reception method of the invention includes: a step of estimating channel state information with respect to a base-station device; a step of performing despreading for signals received by the plurality of antennas in a spatial direction; and a step of demodulating a desired signal in the signals subjected to despreading processing based on the channel state information.

With such a reception method, it is possible to cause a terminal device to exert a function of suppressing interference by spread gain by applying despreading processing in the spatial direction, so that it is possible to contribute to improvement in spectral efficiency.

Advantageous Effects of Invention

According to the invention, in a radio communication system that performs large-scale MU-MIMO transmission, it is possible to realize high-efficient MU-MIMO transmission while reducing load on a base-station device, thus making it possible to contribute to significant improvement in spectral efficiency of the radio communication system.

DESCRIPTION OF EMBODIMENTS

Description will hereinafter be given for a communication technique according to embodiments of the invention with reference to drawings. Matters described for the embodiments are each one aspect for understanding the invention, and contents of the invention shall not be interpreted in a manner limited to the embodiments.

Hereinbelow, unless otherwise specified, $A^T$ represents a transpose matrix of a matrix A, $A^H$ represents an adjoint (Hermitian transpose) matrix of the matrix A, $A^{-1}$ represents an inverse matrix of the matrix A, $E[x]$ represents an ensemble average of a random variable x, and trace (A) represents an output of calculation of trace of the matrix A.

[1. First Embodiment]

Figure 1:
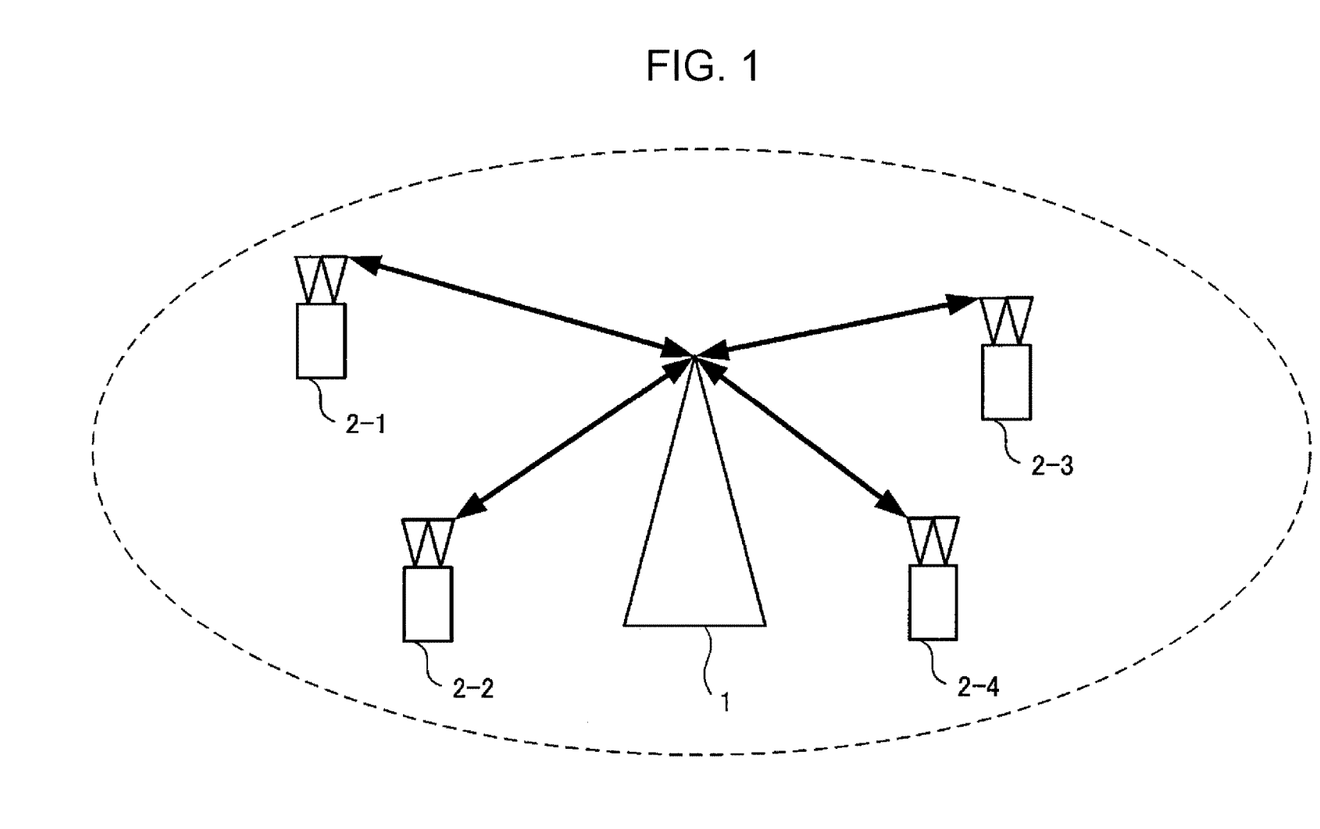
FIG. 1 illustrates one example of a scheme of a radio communication system according to a first embodiment of the invention.

FIG. 1 illustrates one example of a scheme of a radio communication system according to a first embodiment of the invention. In the first embodiment, U terminal devices 2 (also called radio reception devices) (four terminal devices 2-1 to 2-4 in FIG. 1), each of which has $N_r$ antennas, are connected to a base-station device 1 (also referred to as a radio transmission device) which is allowed to perform Multi-User Multiple-Input Multiple-Output (MU-MIMO) transmission and has $N_t$ antennas. R data streams are simultaneously transmitted to each of the terminal devices 2 and R is referred to as the number of transmitted data streams or a rank. Note that, each of the terminals 2 may have different values of $N_r$ and R.

[1.1 Base-station Device 1]

Figure 2:
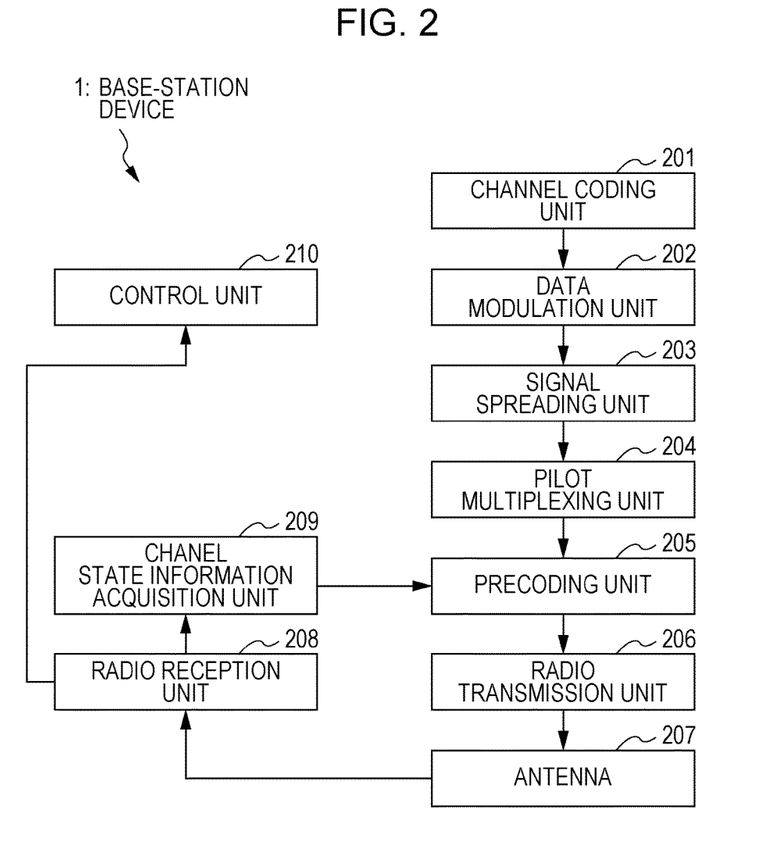
FIG. 2 is a block diagram illustrating one configuration example of a base-station device 1 of the invention.

FIG. 2 is a block diagram illustrating one configuration example of the base-station device 1 according to the present embodiment. As illustrated in FIG. 2, the base-station device 1 is constituted by a channel coding unit 201, a data modulation unit 202, a signal spreading unit 203, a pilot multiplexing unit 204, a precoding unit 205, a radio transmission unit 206, an antenna 207, a radio reception unit 208, a channel state information acquisition unit 209, and a control unit 210. Note that, the antenna 207 is suitably formed of several hundred antenna elements, but may be formed of any number of antenna elements.

Figure 3:
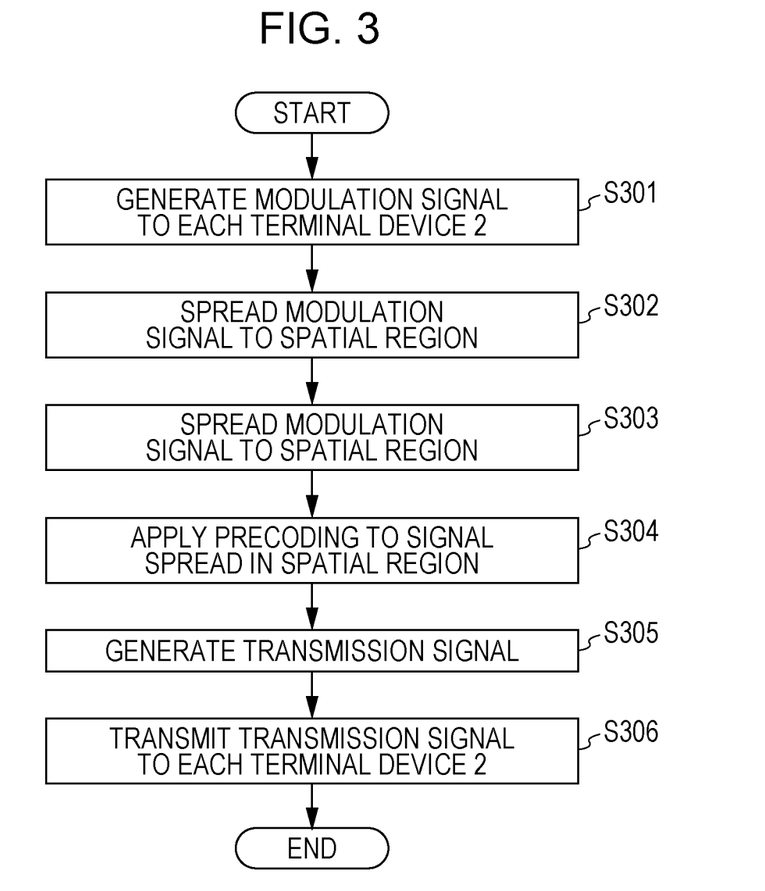
FIG. 3 is a flowchart illustrating one example of signal processing by the base-station device 1 of the invention.

FIG. 3 is a flowchart for explaining one example of signal processing by the base-station device 1. The signal processing of the base-station device 1 will be described below with reference to FIG. 2 and FIG. 3.

First, the channel coding unit 201 applies channel coding to a transmission bit sequence (transmission information) addressed to each terminal device 2. Then, the data modulation unit 202 applies digital modulation to the coded bit sequence and generates a modulation signal (data signal) addressed to each terminal device 2 (step S301).

Next, the signal spreading unit 203 uses a spread code to perform spreading and multiplexing for the modulation signal addressed to each terminal device 2 in a receive antenna direction (a layer direction, a spatial direction) of each terminal device 2 (step S302). The spread code, such as a Hadmard code, a Discrete Fourier Transform (DFT) sequence, or a Gold code, is able to be used whether to be an orthogonal code or a quasi-orthogonal code. A spreading factor SF of the spread code is suitably the number of receive antennas $N_r$ included in each terminal device 2, but may be any value equal to or less than $N_r$. Note that, the spread code used by the signal spreading unit 203 for spreading and multiplexing and the spreading factor SF thereof may be common or different between the respective terminal devices 2.

The spread code used by the base-station device 1 is able to be determined in advance between the base-station device 1 and each terminal device 2. For example, when it is set that the base-station device 1 uses a Walsh matrix having a matrix size of SF rows and SF columns according to the spreading factor SF and uses spread codes described in the Walsh matrix from a first column in turn for the number of the rank, the base-station device 1 and each terminal device 2 are able to mutually grasp spread codes used for spreading and multiplexing by exchanging the rank. In addition, based on channel state information or the like described below, the base-station device 1 may adaptively change the spread code to be used. When adaptively changing the spread code to be used, the base-station device 1 is able to notify each terminal device 2 of information indicating the spread codes being used.

Next, the pilot multiplexing units 204 generates a reference signal and multiplexes it with the modulation signal subjected to spreading and multiplexing (step S303). The reference signal includes a pilot for channel estimation, which is used by each terminal device 2 to estimate channel state information, and a pilot for demodulation, which is used by each terminal device 2 to demodulate data.

The precoding unit 205 then applies precoding to the modulation signal, for which spreading and multiplexing has been performed, based on the channel state information with respect to each terminal device 2 and generates a transmission signal (step S304). Methods of the spreading and multiplexing and the precoding will be described below.

Next, the radio transmission unit 206 converts the transmission signal into a transmission signal of radio frequency (RF) band (step S305). Then, the base-station device 1 transmits the transmission signal to each terminal device 2 through the antenna 207 (step S306).

On the other hand, the base-station device 1 also has a function of receiving a transmission signal from each terminal device 2. The base-station device 1 receives transmission signal from each terminal device 2 through the antenna 207. The radio reception unit 208 converts the received transmission signal into baseband.

The base-station device 1 according to the present embodiment acquires channel state information, which is used by the precoding unit 205, based on the transmission signal from each terminal device 2. The channel state information includes reception quality and a desired rank of each terminal device 2, and information of a MIMO channel matrix. The MIMO channel matrix refers to a matrix which has, as a component, a complex channel gain between each transmit antenna of the base-station device 1 and each receive antenna of each terminal device 2. The channel state information acquisition unit 209 is able to grasp channel state information from control information associated with the channel state information included in the transmission signal from each terminal device 2. The channel state information acquisition unit 209 is also able to grasp channel state information by performing channel estimation based on the transmission signal from each terminal device 2.

The channel state information acquired by the channel state information acquisition unit 209 is input to the precoding unit 205 and the control unit 210. Based on the input channel state information and the like, the control unit 210 controls a channel coding rate, a data modulation scheme, a rank (the number of spreading and multiplexing), resource arrangement, scheduling, and the like which are applied to transmission information addressed to each terminal device 2.

The signal processing of the precoding unit 205 will be described. When a modulation signal vector to a u-th terminal device 2-$u$ is $d_u = [d_{u,1}, \ldots, d_{u,R}]^T$ and a spread code matrix with SF rows and R columns, which has a spread matrix forming a spread code as a component is C, a spread modulation signal vector $x_u$ addressed to the terminal device 2-$u$, for which spreading and multiplexing has been performed, is provided by $x_u = Cd_u$. In this case, each of modulation signals $d_{u,1}, \ldots, d_{u,R}$ serves as a unit of spreading and multiplexing (spread chip).

Here, a MIMO channel matrix between the base-station device 1 and all the terminal devices 2 to which the modulation signal subjected to spatial multiplexing is transmitted by the base-station device 1 is H. H is provided by $H = [h_1^T, \ldots, h_u^T]^T$, and $h_u$ denotes a MIMO channel matrix with $N_r$ rows and $N_t$ columns between the base-station device 1 and the terminal device 2-$u$.

The precoding unit 205 calculates a precoding matrix W based on the MIMO channel matrix H, and applies precoding by which each of the spread modulation signal vectors $x_1, \ldots, x_U$ addressed to each terminal device 2 is multiplied by W. Note that, the precoding 205 is also able to multiply the pilot for demodulation by W.

W denotes a matrix with $N_t$ rows and (U×SF) columns and a matrix which is able to improve a received-Signal-to-Interference plus Noise power Ratio (SINR) of each terminal device 2. W is provided by, for example, a formula (1), a formula (2), and a formula (3).

[Expression 1]

$$W_{MRC} = H^H \quad (1)$$

$$W_{ZF1} = H^H (HH^H)^{-1} \quad (2)$$

$$W_{ZF2} = [W_{ZF2,1}, \ldots, W_{ZF2,u} \ldots, W_{ZF2,U}] \quad (3)$$

$$W_{ZF2,u} = h_u^H (h_u h_u^H)^{-1} \quad (4)$$

Here, $W_{ZF2,u}$ denotes a matrix with $N_t$ rows and R columns to be multiplied by $x_u$. $W_{MRC}$ makes it possible to maximize a received-Signal-to-Noise power Ratio (SNR) in each receive antenna of each terminal device 2. With $W_{MRC}$, even though IUI remains, a sufficiently high received-SINR is able to be ensured when the number of transmit antennas $N_t$ is sufficiently great. $W_{ZF1}$ makes it possible to maximize a received-Signal-to-Interference power Ratio (SIR) in each receive antenna of each terminal device 2. $W_{ZF2}$ makes it possible to completely suppress only Inter-Stream-Interference (ISI) which is imparted between R data streams simultaneously transmitted to each terminal device 2.

Note that, W may be weight $W_{BD}$ which realizes block diagonalizing of H. $W_{BD}$ converts H into a block diagonalized matrix as in the formula (5).

[Expression 2]

$$HW_{BD} = [h_1^T, \ldots, h_u^T, \ldots, h_U^T]^T [W_{BD,1}, \ldots, W_{BD,u}, \ldots, W_{BD,U}] \quad (5)$$

$$= \begin{pmatrix} h_1 W_{BD,1} & \cdots & 0 & \cdots & 0 \\ \vdots & \ddots & & & \vdots \\ 0 & & h_u W_{BD,u} & & 0 \\ \vdots & & & \ddots & \vdots \\ 0 & \cdots & 0 & \cdots & h_U W_{BD,U} \end{pmatrix}$$

In the formula, $W_{BD,u}$ denotes a matrix with $N_t$ rows and R columns to be multiplied by $x_u$. $W_{BD}$ makes it possible to completely suppress IUI of an interfering signal received by each terminal device 2. Though $W_{BD}$ provided by the formula (5) completely suppresses the IUI, the precoding unit 205 may calculate block diagonalizing weight based on the minimum mean square error (MMSE) criterion which achieves the maximum received-SINR. Note that, since ISI is not considered in $W_{BD}$, the precoding unit 205 may multiply a precoding matrix for the purpose of suppression of the ISI after multiplying $W_{BD}$. In addition, the ISI may be suppressed by each terminal device 2.

In conventional MIMO transmission, a precoding matrix W is determined depending on the number of transmission streams R of each terminal device 2. Thus, even when channel estimation information does not change, the precoding unit 205 needs to calculate W again each time the number of transmission streams R changes. However, in Massive MIMO transmission in which the number of transmission antenna elements is the order of several hundreds, a size of the precoding matrix W is also the order of several hundreds, so that a load to the base-station device 1, which is caused by changing a precoder, is heavy.

On the other hand, a size of W calculated by the precoding unit 205 according to the present embodiment is always a matrix of $N_t$ rows and (U×SF) columns and does not depend on the number of transmission streams R of each terminal device 2. When the number of transmission streams R of each terminal device 2 changes, the signal spreading unit 203 is only required to change the number of spreading and multiplexing (the number of columns of the spread code matrix C). Thus, with a method according to the present embodiment, the base-station device 1 is able to easily change the number of transmission streams without changing the precoding matrix W. In addition, by reducing the number of spreading and multiplexing, the base-station device 1 is able to easily improve the received-SINR of each terminal device 2.

[1.2 Terminal Device 2]

Figure 4:
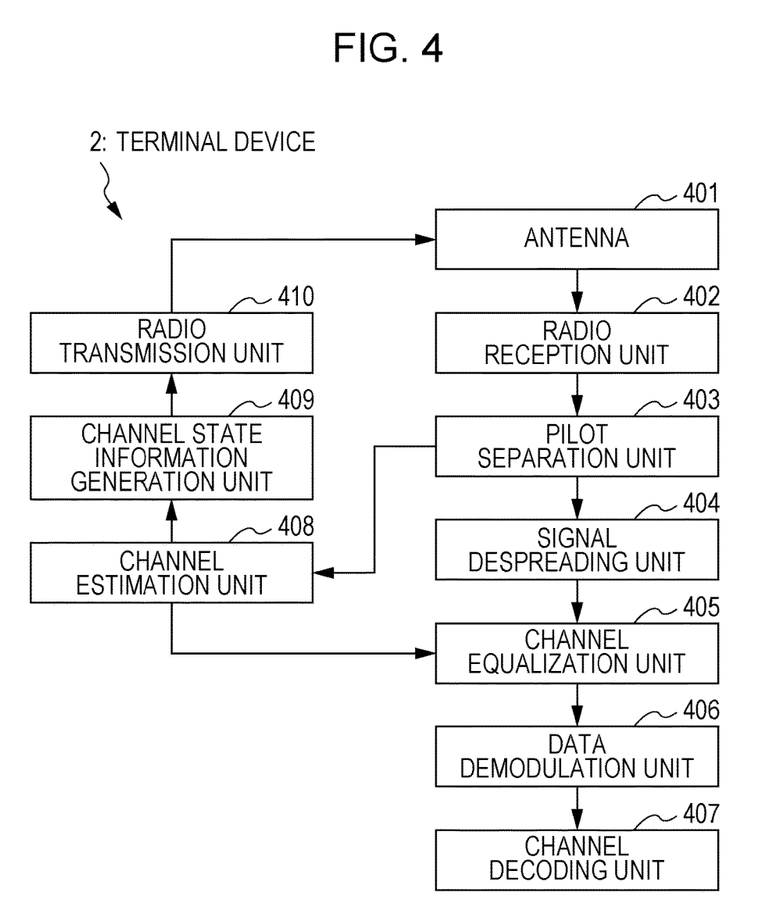
FIG. 4 is a block diagram illustrating one configuration example of a terminal device 2 of the invention.

FIG. 4 is a block diagram illustrating one configuration example of the terminal device 2 according to the first embodiment of the invention. As illustrated in FIG. 4, the terminal device 2 is configured by including an antenna 401, a radio reception unit 402, a pilot separation unit 403, a signal despreading unit 404, a channel equalization unit 405, a data demodulation unit 406, a channel decoding unit 407, a channel estimation unit 408, a channel state information generation unit 409, and a radio transmission unit 410. The antenna 401 includes $N_r$ antenna elements.

Figure 5:
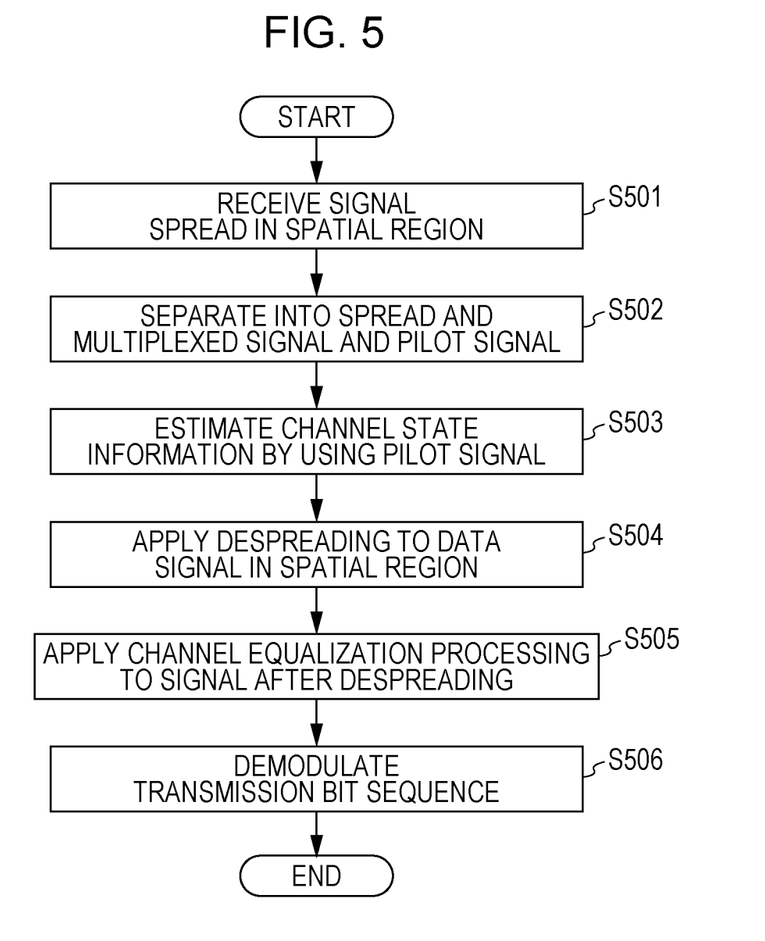
FIG. 5 is a flowchart illustrating one example of signal processing by the terminal device 2 of the invention.

FIG. 5 is a flowchart illustrating a part of the signal processing by the terminal device 2 according to the first embodiment of the invention. The signal processing by the terminal device 2 according to the present embodiment will be described below with reference to FIG. 4 and FIG. 5.

The terminal device 2 receives a signal transmitted by the base-station device 1 through the antenna 401. The radio reception unit 402 then converts the received signal to a baseband signal (step S501).

Next, the pilot separation unit 403 separates the received signal into a spread and multiplexed signal and a pilot and inputs them to the channel equalization unit 405 and the channel estimation unit 408 (step S502).

Next, the channel estimation unit 408 performs channel estimation based on the pilot. In this case, the channel estimation unit 408 performs channel estimation based on a pilot for demodulation and inputs a channel estimation value thereof to the channel equalization unit 405 (step S503).

The signal despreading unit 404 then applies despreading to the spread and multiplexed signal (step S504). Here, a reception signal vector having, as a component, a spread and multiplexed signal received by each receive antenna of the u-th terminal device 2-$u$ is $r_u = [r_{u,1}, \ldots, r_{u,N_r}]^T$. An output of despreading is provided by a formula (6).

[Expression 3]

$$\hat{d}_u = C^H r_u \quad (6)$$

Since a modulation signal to each terminal device 2 is spread and multiplexed in a receive antenna direction by the signal spreading unit 203 of the base-station device 1, the signal despreading unit 404 is able to obtain R modulation signals addressed to each terminal device 2 by performing despreading in a receive antenna direction (a layer direction, a spatial direction, a spatial region) with the use of the spread code matrix C which is the same as the spread code matrix C used by the signal spread unit 203 of the base-station device 1. The spread code used for despreading may be determined in advance between the base-station device 1 and each terminal device 2, or each terminal device 2 may determine the spread code used for despreading based on notification information from the base-station device 1.

Next, the channel equalization unit 405 performs channel equalization based on the channel estimation value which is estimated by the channel estimation unit 408 based on the pilot for demodulation (step S505). Note that, the signal processing of the channel equalization unit 405 and the signal processing of the signal despreading unit 404 may be applied in reversed order. In particular, when the base-station device 1 performs precoding by using $W_{BD}$ by which suppression of ISI is not performed, the terminal device 2 is able to perform despreading at the signal despreading unit 404 after applying ISI suppression processing such as MMSE detection at the channel equalization unit 405.

The data demodulation unit 406 then applies demodulation processing to the signal after channel equalization. Next, the channel decoding unit 407 applies channel decoding processing to the signal subjected to the demodulation processing and obtains a transmission bit sequence to the base-station device 1 (step S506).

Note that, each terminal device 2 also has a function of transmitting a signal to the base-station device 1. The terminal device 2 according to the present embodiment is able to transmit information associated with channel state information with respect to the base-station device 1 to the base-station device 1.

The channel estimation unit 408 performs channel estimation based on a pilot for channel estimation to estimate a MIMO channel matrix, reception quality, the desired number of transmission streams, and the like. Then, based on the information estimated by the channel estimation unit 408, the channel state information generation unit 409 generates information associated with the channel state information and multiplexes it with a transmission signal to the base-station device 1. Information obtained by directly quantizing the information estimated by the channel estimation unit 408, information conforming to a rule which is determined in advance between the base-station device 1 and each terminal device 2 (for example, such as a codebook in which a plurality of vectors are described, or an index of a table in which a plurality of modulation schemes or coding rates that realize spectral efficiency is described), and the like correspond to the information associated with the channel state information.

The radio transmission unit 410 converts the transmission signal which includes the information associated with the channel state information into a transmission signal of RF band. Each terminal device 2 then transmits the transmission signal to the base-station device 1 through the antenna 401.

Note that, a transmission scheme used by the base-station device 1 and a plurality of terminal devices 2 according to the present embodiment is not limited. For example, multi-carrier transmission represented by orthogonal frequency division multiplex, or broadband single carrier transmission assuming that cyclic prefix is inserted is suitably used. In this case, each sub-carrier, a resource block obtained by making sub-carriers into one group, or a whole signal may be set as a spread chip.

An access scheme used by the base-station device 1 and the plurality of terminal devices 2 according to the present embodiment is not limited. For example, a radio communication system using an access scheme of orthogonal frequency division multiplex access, single carrier frequency division multiplex access, or the like is suitably used.

With the base-station device 1 and the plurality of terminal devices 2 that have been described above, the base-station device 1 is able to simultaneously transmit signals addressed to the plurality of terminal devices 2 based on the precoding matrix W calculated irrespective of the rank R of each of the terminal devices 2. By changing the number of data signals to be spread and multiplexed, which are addressed to each terminal device 2, the base-station device 1 is able to flexibly control a transmission rate and reception quality. Thus, it is possible to realize high-efficient radio communication, thus making it possible to contribute to improvement in spectral efficiency of the radio communication system.

[2. Second Embodiment]

In a second embodiment, the base-station device 1 spreads and multiplexes a modulation signal addressed to each terminal device 2 in a direction other than the receive antenna direction of each terminal device 2.

[2.1 Base-station Device 1]

A configuration of the base-station device 1 according to the present embodiment is similar to that of the first embodiment (refer to FIG. 2). However, signal processing in the signal spreading unit 203 of the base-station device 1 according to the present embodiment is different from that of the first embodiment. The signal processing in a signal spreading unit 203a according to the present embodiment will be described below.

The signal spreading unit 203a spreads and multiplexes a modulation signal to each terminal device 2 not only in the receive antenna direction (spatial direction) of each terminal device 2 but also in a time direction and a frequency direction. Spreading factors in the time, frequency, and spatial directions are respectively set as $SF_t$, $SF_f$, and $SF_s$ below. When orthogonal frequency division multiplex transmission is assumed, spreading and multiplexing in the frequency direction is spreading and multiplexing in a sub-carrier direction, and spreading and multiplexing in the time direction is spreading and multiplexing in a direction of an orthogonal frequency division multiplexed signal.

First, similarly to the first embodiment, the signal spreading unit 203a spreads and multiplexes R modulation signals addressed to each terminal device 2 in the spatial direction. At this time, a spread code matrix used for the spreading and multiplexing in the spatial direction may be common between the terminal devices 2.

Then, the signal spreading unit 203a further spreads the spread modulation signals addressed to each terminal device 2, which have been spread and multiplexed in the spatial direction, in the time and frequency directions. At this time, a spread code used by the signal spreading unit 203a for spreading the spread modulation signals in the time and frequency directions is desired to be orthogonal between the terminal devices 2. This is because it is possible to suppress IUI highly efficiently by using the spread code orthogonal between the terminal devices 2 because correlation of channels is high between adjacent frequency resources and time resources.

Note that, a spread code orthogonal between terminal devices 2 may be used for the spread code matrix used by the signal spreading unit 203a for the spreading and multiplexing in the spatial direction. Thus, when the number of data streams to each terminal device 2 is R, the base-station device 1 according to the present embodiment is able to multiplex $(SF_t \times SF_f \times SF_s)/R$ terminal devices 2 at maximum by spreading and multiplexing.

Note that, when the orthogonal spread code is used for the spreading and multiplexing of the modulation signals addressed to each terminal device 2, the base-station device 1 is able to notify each terminal device 2 of information indicating the spread code used for the spreading and multiplexing. An example of the information indicating the spread code includes a column number of the spread code matrix.

Note that, when the number of transmission streams and the spreading factor are different between the terminal devices 2, the signal spreading unit 203*a* is able to secure orthogonality between the terminal devices 2 by using an orthogonal variable spreading factor (OVSF).

[2.2 Terminal Device 2]

A configuration of each terminal device 2 according to the present embodiment is similar to that of the first embodiment (refer to FIG. 4). However, signal processing in the signal despreading unit 404 is different. A signal despreading unit 404*a* according to the present embodiment is able to obtain a modulation signal addressed to each terminal device 2 by despreading the signal received by each receive antenna not only in the receive antenna direction but also in the time and frequency directions.

According to a method of the present embodiment, since IUI is suppressed by spreading and multiplexing, the precoding matrix W used by the precoding unit 205 of the base-station device 1 does not need to be a matrix in consideration of IUI (for example, a matrix realizing block diagonalizing). Thus, since the use of $W_{MRC}$ or $W_{ZF2}$ is sufficient for the precoding unit 205, it is not necessary to calculate the precoding matrix W to be multiplied by a spread modulation signal addressed to each terminal device 2 again according to the number of transmission data streams R or a combination of terminal devices 2 to be multiplexed. By adjusting the spreading factors $SF_t$, $SF_f$, and $SF_s$ in the time, frequency, and spatial directions and the numbers of spreading and multiplexing in the respective directions, the base-station device 1 is able to flexibly change the number of terminals to be multiplexed and the number of transmission data streams, so that it is possible to realize high-efficient multi-user transmission, thus making it possible to contribute to improvement in spectral efficiency of the radio communication system.

[3. Third Embodiment]

In the first and second embodiments, suppression of IUI by spreading and multiplexing and suppression of IUI by precoding are controlled independently. In the present embodiment, a case where suppressions of IUI by spreading and multiplexing and by precoding are associated is targeted.

[3.1 Base-Station Device 1]

A configuration of the base-station device 1 according to the present embodiment is similar to that of the first embodiment (refer to FIG. 2). However, signal processing in the signal spreading unit 204 and the precoding unit 205 is different.

In a signal spreading unit 204*b* and a precoding unit 205*b* according to the present embodiment, spreading and multiplexing, and precoding in which despreading performed in each terminal device 2 is considered are applied to a modulation signal addressed to each terminal device 2. For simplification, description will be given below for a case where two terminal devices 2 are spatially multiplexed and spreading and multiplexing are performed in a receive antenna direction.

When spreading and multiplexing are performed in the receive antenna direction, each terminal device 2 performs despreading processing as provided by the formula (6). Each output of despreading of the signal despreading units 404 of two terminal device 2-1 and terminal device 2-2 is provided by a formula (7).

[Expression 4]

$$\hat{d} = \begin{pmatrix} \hat{d}_1 \\ \hat{d}_2 \end{pmatrix} = \begin{pmatrix} C_1^H r_1 \\ C_2^H r_2 \end{pmatrix} \quad (7)$$

Note that, it is assumed in the formula (7) that different spread code matrixes are used for each terminal device 2. Reception signal vectors $r_1$ and $r_2$ of the terminal device 2-1 and the terminal device 2-2 are provided by a formula (8).

[Expression 5]

$$\begin{pmatrix} r_1 \\ r_2 \end{pmatrix} = \begin{pmatrix} h_1 \\ h_2 \end{pmatrix} s + \begin{pmatrix} \eta_1 \\ \eta_2 \end{pmatrix} \quad (8)$$

$$= \begin{pmatrix} h_1 \\ h_2 \end{pmatrix} (W_1 \quad W_2) \begin{pmatrix} C_1'^H d_1 \\ C_2'^H d_2 \end{pmatrix} + \begin{pmatrix} \eta_1 \\ \eta_2 \end{pmatrix}$$

In the formula, $C_1'$ and $C_2'$ denote spread code matrixes used for spreading and multiplexing by the signal spreading unit 204*b* according to the present embodiment. That is, in the present embodiment, the spread code matrixes used by the signal spreading unit 204*b* and the signal despreading unit 404 are not necessarily common.

The spreading and multiplexing, and the precoding that are performed by the signal spreading unit 204*b* and the precoding unit 205*b* according to the present embodiment are signal processing by which a mean square error between an output of despreading provided by the formula (7) and a modulation signal $[d_1^T, d_2^T]^T$ addressed to each terminal device 2 is minimized. That is, the spreading and multiplexing, and the precoding that are performed by the signal spreading unit 204*b* and the precoding unit 205*b* satisfy a formula (9).

[Expression 6]

$$\{C_1', C_2', W\} = \arg \min J(C_1', C_2', W) \quad (9)$$

$$J(C_1', C_2', W) = E[\text{trace}(ee^H)] + \lambda(E[\text{trace}(ss^H)] - P) \quad (10)$$

$$e = \begin{pmatrix} \hat{d}_1 \\ \hat{d}_2 \end{pmatrix} - \begin{pmatrix} d_1 \\ d_2 \end{pmatrix} \quad (11)$$

Here, $\lambda$ denotes an undetermined coefficient of Lagrange in consideration of a restraint condition making transmit power constant, and P denotes a sum of transmit power. By obtaining a spread code matrix and a precoding matrix that satisfy the formula (9), received-SINR of each terminal device 2 is able to be improved.

Note that, when it is assumed that the spread code matrixes $C_1'$ and $C_2'$ are commonly used between the respective terminal devices similarly to the first and second embodiments, and further commonly used between the signal spreading unit 204*b* and the signal despreading unit 404 in the formula (9), it is only required to optimize the precoding matrix W in the formula (9). For example, by differentiating the formula (9) by W, the optimum W is able to be obtained.

The precoding W may be determined as $W_{MRC}$ or the like in advance in the formula (9) to optimize the spread code matrix C. Further, the base-station device 1 is also able to similarly optimize the spread code matrix used for despreading by each terminal device 2, and a method for channel equalization. In this case, the base-station device 1 is able to notify each terminal device 2 of information indicating the spread code matrix used for despreading by each terminal device 2, and the method for channel equalization.

The present embodiment targets the case where the spreading and multiplexing, and the precoding that are performed by the base-station device 1 are associated. According to the method of the present embodiment, received-SINR of each terminal device 2 is able to be improved, thus making it possible to realize high-efficient multi-user transmission.

[4. For all Embodiments]

Though description has been given in the first to third embodiments for the case where spreading is performed in the receive antenna direction of each terminal device 2 to perform code multiplexing, code multiplexing may be performed after performing interleaving for sorting spread signals. In this case, each terminal device 2 performs deinterleaving which is reverse processing of interleaving after demodulation and then performs despreading processing. Note that, when signals are multiplexed after interleaving, the same spread code and different interleave patterns may be used for the respective signals to be multiplexed. Note that, the interleaving described here is able to be performed not only in the receive antenna direction of each terminal device but also in the time direction and/or the frequency direction. In addition, different interleave patterns may be used for the respective terminal devices 2.

Though description has been given in the first to third embodiments for the case where a spread code is used for spreading processing, a case where the spreading processing is performed by channel coding is also included in the present embodiment. For example, a case where spreading processing is performed by channel coding of a coding rate R instead of using a spread code of a spreading factor R is also included in the present embodiment. In this case as well, it is also possible to apply different interleaving to each of the signals to be multiplexed. Each terminal device 2 is only required to perform deinterleaving after demodulation and then perform channel decoding. At a time of despreading processing for a certain signal, each terminal device 2 is also able to use information of other signals which have been already detected and also able to perform such processing repeatedly.

As above, the embodiments of the invention have been described in detail with reference to drawings, but specific configurations are not limited to the embodiments, and a design and the like which are not departed from the main subject of the invention are also included in the scope of the claims.

Note that, the invention is not limited to the embodiments described above. The base-station device 1 and the terminal device 2 of the invention are not limited to be applied to a terminal device of a cellular system or the like, but, needless to say, is applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

A program which runs in the base-station device 1 and the terminal device 2 concerning the invention is a program that controls a CPU and the like (program that causes a computer to function) such that the functions in the aforementioned embodiments concerning the invention are realized. The pieces of information handled by the devices are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card or the like), an optical recording medium (for example, a DVD, an MO, an MD, a CD, a BD or the like), a magnetic recording medium (for example, a magnetic tape, a flexible disc or the like), and the like. Moreover, there is also a case where, by executing the loaded program, not only the functions of the embodiments described above are realized, but also by performing processing in cooperation with an operating system, other application programs or the like based on an instruction of the program, the functions of the invention are realized in some cases.

When being distributed in the market, the program is able to be stored in a portable recording medium and distributed or be transferred to a server computer connected through a network such as the Internet. In this case, a storage device of the server computer is also included in the invention. A part or all of the base-station device 1 and the terminal device 2 in the embodiments described above may be realized as an LSI which is a typical integrated circuit. Each functional block of the base-station device 1 and the terminal device 2 may be individually formed into a processor, or a part or all thereof may be integrated and formed into a processor. Further, a method for making into an integrated circuit is not limited to the LSI and a dedicated circuit or a versatile processor may be used for realization. Further, when a technology for making into an integrated circuit in place of the LSI appears with advance of a semiconductor technology, an integrated circuit by this technology may be also used.

INDUSTRIAL APPLICABILITY

The invention is suitably used for a base-station device, a terminal device, a transmission method, and a reception method.

Note that, the present international application claims priority from Japanese Patent Application No. 2013-257539 filed on Dec. 13, 2013, and the entire contents of Japanese Patent Application No. 2013-257539 are hereby incorporated by reference.

REFERENCE SIGNS LIST 1 base-station device
2, 2-1, 2-2, 2-3, 2-4, 2-$u$ terminal device
201 channel coding unit
202 data modulation unit
203 signal spreading unit
204 pilot multiplexing unit
205 precoding unit
206, 410 radio transmission unit
207, 401 antenna
208, 402 radio reception unit
209 channel state information acquisition unit
210 control unit
403 pilot separation unit
404 signal despreading unit
405 channel equalization unit
406 data demodulation unit
407 cannel decoding unit
408 channel estimation unit
409 channel state information generation unit

The invention claimed is:

1. A base-station device having a plurality of antennas and performing communication with a plurality of terminal devices simultaneously, comprising:
   a channel state information acquisition circuitry configured to or programmed to acquire channel state information with respect to the plurality of terminal devices;
   a signal spreading circuitry configured to or programmed to perform spreading and multiplexing for a plurality of signals addressed to each of the terminal devices by using a spread code in a spatial direction of each of the terminal devices; and
   a precoding circuitry configured to or programmed to apply precoding to the signals, which have been spread and multiplexed, based on the channel state information; wherein
   information indicating the spread code used by the signal spreading circuitry is notified to the plurality of terminal devices.

2. The base-station device according to claim 1, wherein the precoding circuitry is configured to or programmed to apply precoding to the signals, which have been spread and multiplexed, based on the channel state information and the spread code; and
   information indicating a spread code to be used for despreading the signals which have been spread and multiplexed in the spatial direction, and information indicating a channel equalization method for demodulating the signals subjected to the precoding are notified to the plurality of terminal devices.

3. The base-station device according to claim 1, wherein the signal spreading circuitry is configured to or programmed to determine the spread code to be used for spreading and multiplexing based on the precoding.

4. The base-station device according to claim 1, wherein at least a part of the spread code is different among the plurality of terminal devices.

5. The base-station device according to claim 1, wherein the signal spreading circuitry is further configured to or programmed to spread the signals, which have been spread and multiplexed in the spatial direction of each of the terminal devices, in any direction of a time direction, a frequency direction, and a combination of time and frequency directions.

6. A terminal device having a plurality of antennas and performing communication with a base-station device, comprising:
   a channel estimation circuitry configured to or programmed to estimate channel state information with respect to the base-station device;
   a signal despreading circuitry configured to or programmed to perform despreading for signals received by the plurality of antennas in a spatial direction based on a spread code to be used for despreading;
   and a channel equalization circuitry configured to or programmed to demodulate a desired signal in the signals subjected to despreading processing based on the channel state information;
   wherein the spread code to be used for despreading is determined based on an information indicating the spread code that is notified to the terminal device by the base station.

7. The terminal device according to claim 6, wherein the signal despreading circuitry is further configured to or programmed to despread the signals, which have been despread in the spatial direction, in any direction of a time direction, a frequency direction, and a combination of time and frequency directions.

8. The terminal device according to claim 6, wherein the signals received by the plurality of antennas are spread in the spatial direction of the terminal device.

* * * * *